UNITED STATES PATENT OFFICE.

HORACE W. LASH, OF CLEVELAND, OHIO, ASSIGNOR TO THE WEST COAST IRON COMPANY, OF SAN FRANCISCO, CALIFORNIA, A CORPORATION OF OHIO.

METHOD OF MAKING PIG-IRON FROM STEEL-SCRAP.

1,061,189. Specification of Letters Patent. Patented May 6, 1913.

No Drawing. Application filed March 2, 1912. Serial No. 681,286.

*To all whom it may concern:*

Be it known that I, HORACE W. LASH, a citizen of the United States, residing at Cleveland, in the county of Cuyahoga and State of Ohio, have invented certain new and useful Improvements in Methods of Making Pig-Iron from Steel-Scrap, of which the following is a specification.

Pig iron as commonly understood is the product of the blast furnace, and is produced directly from the iron ore with the aid of carbon and limestone. This product of the blast furnace in its natural condition is suitable for the manufacture of iron castings, or by further well known treatment may be converted into wrought iron or steel for commercial purposes. Where the pig iron is converted into steel, the carbon and silicon contained therein are practically eliminated, due to the fact that but little, if any, silicon is desired in the finished steel and the carbon should only exist in the form of combined carbon and very rarely exceeds one and one-half per cent., although some grades of steel carry approximately two per cent. of carbon. However, such is the extreme limit, and anything beyond this, especially where graphitic carbon and silicon exists to any extent, would come under the head of cast or pig iron.

So far as I am aware all pig iron heretofore manufactured has been produced in the main from the iron ore, and approximately one hundred tons or the ore is required to produce fifty tons of pig iron. Where the fuel employed, such as coke, is plentiful pig iron may be produced from the ore at comparatively a reasonable cost, but in places where the usual fuel employed is extremely expensive, the cost incident to the production of the pig iron is substantially prohibitive to the manufacture thereof, even should a plentiful supply of the ore exist in such territory. On the Pacific slope and more particularly in the States of California, Oregon and Washington, the cost of coke or other fuel ordinarily employed in the reduction of iron ore is too expensive to permit of the employment thereof for the economic production of pig iron, inasmuch as the cost of the finished article would greatly exceed that for which the same may be purchased elsewhere and brought into such territory.

The object of the present invention is to produce pig iron within the State of California, or other territory having an ample supply of low cost fuel, at a price substantially that at which the same may be manufactured in more favored territory as to fuel and ore, say, at Pittsburgh, Penn., taking said district as controlling the cost of production and where pig iron may be produced at an approximate cost of thirteen dollars per ton. Usually, pig iron is sold in California, from six to eight dollars more per ton than in Pittsburgh, the excess charge being due to freight and other expenses incident to the delivery of the product in California.

The supply of pig iron for the Pacific slope is largely drawn from Alabama by rail and water and partly from China and England by water, and the selling price of this commodity in the States of California, Oregon and Washington during the past ten years has ranged from twenty to thirty-two dollars per ton.

In California there is a large supply of cheap fuel in the form of oil which may be utilized for the production of pig iron, and while in the States of California, Oregon and Washington, the consumption of pig iron is about one hundred thousand tons annually, there is annually produced in said States approximately two hundred thousand tons of scrap material consisting largely of steel, although there is contained within said scrap material a small per cent. of wrought iron and cast iron, and by the expression "scrap material" as hereinafter employed is meant discarded steel, or a mixture of steel and wrought iron, also a mixture of steel, wrought iron and cast iron, the scrap steel however predominating. This material comprises old rails, girders, beams, sheets, turnings, bars, borings, etc., in the main discarded and worn out material from the railroads, manufacturing and surplus material from fabricating plants. It is this discarded material having but small value, limited market and the selling price of which on the Pacific coast ranges between three and eight dollars per ton, that I have discovered may be successfully utilized for the production of pig iron on the Pacific coast at a cost of approximately thirteen dollars per ton, which is substantially the cost per ton for the manufacture of the pig iron at Pittsburgh, Penn., and by so doing enabling pig iron to be sold on the Pacific coast at a price per ton substantially equal to the selling price per ton at Pittsburgh, Penn., while at the same time not only creating a new industry for the Pacific slope, but enabling a low value commodity to be converted into a product having an enhanced value and increased selling price. From every one hundred tons of the said scrap material slightly over one hundred tons of pig iron may be produced, whereas, as above stated, under the present method of manufacturing pig iron, it is required to treat approximately one hundred tons of iron ore to produce fifty tons of pig iron, and by reason of the available supply of the said scrap material and the unlimited supply of cheap fuel-oil and carbon it is possible to produce pig iron on the Pacific coast at as low a cost as it can be produced at Pittsburgh.

In carrying out the invention any desired form of a melting or gas or oil fired furnace may be employed, and by preference oil is utilized as the fuel medium.

The charge for the production of an average grade of foundry pig iron would be about as follows:—scrap material—80%; carbon—10%; silica—10%; however, the amount of carbon and silica present should be regulated by the amount of carbon and silicon desired in the finished product. During the charging of the mixture into the furnace, care should be used in placing the major portion of the carbon in or near the bottom of the furnace where it can be given protection from the oxidizing flame by being thoroughly covered with the scrap portion of the charge. During the melting of the charge mixture a part of the carbon is chemically united with the iron, and a part is held in the form of free carbon or graphite, the excess carbon present acting as a reducing agent in the reduction of the silica contained in the mixture to silicon, which latter also unites with the iron and thereby forms pig iron of approximately the following chemical composition:—

| | |
|---|---|
| Carbon (combined) | 1.00% |
| Carbon (graphite) | 2.50% |
| Silicon | 2.00% |
| Sulfur | .10% |
| Phosphorus | .20% |
| Iron | 94.20% |
| | 100.00% |

In carrying out the process of converting the scrap material derived from a finished product into pig iron from which it was originally produced, it is not essential that the silicon be derived from the use of silica in the charge mixture, inasmuch as the same may be provided in part or all by the use of ferro-silicon or by the addition of a small quantity of highly silicious pig iron. However, in either case the result would be practically the same, but, for economical reasons, it is desirable to obtain the silicon from the silica used in the mixture.

While any suitable type of melting furnace may be employed, preference is given to the use of a reverberatory furnace, and the charge fed therein is subjected to a melting heat sufficient to reduce the same to a fluid condition, and when the charge has been brought to the proper condition of fluidity, it is drawn off in the usual manner and cast into pigs or such other forms as may be desirable for the purpose for which it is to be used.

By the foregoing a new industry is created, viz.—the production of pig iron by the conversion of the waste material of a finished product into pig iron, and by so doing not only giving an increased value to the same, but permitting pig iron to be produced and placed on the market in places where the usual conditions for the manufacture thereof do not prevail and at a cost substantially the same as that which prevails in the favored places for the manufacture thereof. Heretofore, the mentioned scrap material has simply been utilized by a remelting and reworking thereof, i. e. to say the scrap steel is simply melted or reconverted into a marketable steel, but the material has not been changed or converted into a different product of manufacture. It has simply been a case of fusing together or re-uniting the scrap pieces, but in no manner has the character of the material been changed, inasmuch as in the case of scrap steel it comes out of the factory plant as steel. In the present case the scrap material in the form of separate pieces is re-melted and converted into a different product, viz.—pig iron for use in connection with the manufacture or iron castings, steel and wrought iron, or, in other words, the waste material of a finished product is converted into that from which it was manufactured. In the one case iron ore is employed as the base for the manufacture of pig iron for the production of castings, steel and wrought iron, whereas in the present case the mentioned scrap material of a finished product is utilized as the base for the manufacture of pig iron. In the former case it is required to treat approximately one hundred tons of iron ore to produce substantially fifty tons of pig iron, whereas in the latter case one hundred tons of scrap material with the proper mixture of carbon and silica will produce slightly more than one hundred tons of pig iron.

By the described method pig iron may be produced in furnaces other than a blast furnace, and at a very low cost of manufacture in districts where scrap material as described, fuel oil and carbon are plentiful, and the manufacture thereof successfully compete with the production of pig iron under the methods at present employed in the most favored districts.

The importance of the invention to manufacturers situated in territories having an ample supply of scrap material, fuel oil and carbon but situated at a remote distance from the favored localities for the manufacture of pig iron, will be readily apparent to those skilled in the art and users of pig iron in large quantities.

The foregoing conditions for the manufacture of pig iron on the Pacific coast is rendered possible due to the available supply of scrap material and an unlimited supply of cheap fuel oil and carbon within the State of California, and it is these conditions which have been taken advantage of in carrying out the foregoing invention.

While the proportion of the charge mixture as before given is deemed best for the production of an average grade of foundry iron, the same may be varied as desired without departing from the invention, the essential feature of which resides in the production of pig iron from a base consisting of scrap material of the character hereinbefore mentioned.

Having thus described the invention what is claimed as new and desired to be protected by Letters Patent is:

1. A method of making cast iron which consists in melting in a reverberatory furnace, a mixture of steel scrap, carbon, and silicious material, the carbon of the charge being distributed in the charge mixture in a manner to be protected from the oxidizing flame of the furnace.

2. A method of making cast iron which consists in melting in a reverberatory furnace, a mixture of steel scrap, carbon, and silicious material, the carbon effective for chemical re-action with the charge being placed within the charge mixture at or near the hearth of the furnace, whereby it is protected from the oxidizing flame of the furnace.

In testimony whereof I have signed my name to this specification in the presence of two subscribing witnesses.

HORACE W. LASH.

Witnesses:
 N. A. ACKER,
 D. B. RICHARDS.